United States Patent [19]

Reisch et al.

[11] Patent Number: 6,160,076

[45] Date of Patent: *Dec. 12, 2000

[54] CROSS-LINKED AQUEOUS POLYURETHANE DISPERSIONS CONTAINING DIMER/TRIMER

[75] Inventors: John W. Reisch, Madison; Richard J. Feegel, West Haven; Curtis P. Smith, Cheshire, all of Conn.

[73] Assignee: ARCO Chemical Technology, L. P., Greenville, Del.

[ * ] Notice: This patent is subject to a terminal disclaimer.

[21] Appl. No.: 08/376,270

[22] Filed: Jan. 23, 1995

Related U.S. Application Data

[63] Continuation-in-part of application No. 08/265,369, Jun. 24, 1994.

[51] Int. Cl.$^7$ .................................................. C08G 18/70
[52] U.S. Cl. ................. 528/73; 528/61; 528/67; 528/71; 524/839; 524/840; 524/872; 427/385.5
[58] Field of Search ................................. 528/61, 67, 71, 528/73; 524/839, 840, 872; 427/385.5

[56] References Cited

U.S. PATENT DOCUMENTS

| | | |
|---|---|---|
| 3,412,054 | 11/1968 | Milligan et al. ........................... 260/18 |
| 4,203,883 | 5/1980 | Hangauer, Jr. ................... 260/29.2 TN |
| 4,288,586 | 9/1981 | Bock et al. ............................... 528/67 |
| 4,324,879 | 4/1982 | Bock et al. ............................... 528/45 |
| 4,408,008 | 10/1983 | Markusch ................................ 524/591 |
| 4,419,513 | 12/1983 | Breidenbach et al. ................... 544/222 |
| 4,507,431 | 3/1985 | Stutz et al. .............................. 524/840 |
| 4,554,308 | 11/1985 | Russiello ................................. 524/591 |
| 5,098,983 | 3/1992 | Mosbach et al. ......................... 528/59 |
| 5,169,895 | 12/1992 | Coogan et al. .......................... 524/591 |

*Primary Examiner*—Rachel Gorr
*Attorney, Agent, or Firm*—Dale Lynn Carlson; Wiggin & Dana

[57] ABSTRACT

The present invention relates to a composition being an aqueous dispersion of a polyurethane in water, said composition comprising water and the reaction product of (a) a water-dispersible isocyanate-terminated polyurethane prepolymer having an NCO content of between 2.1 and 10% by weight, (b) an organic polyisocyanate adduct mixture comprising a polyisocyanate dimer and a polyisocyanate trimer and having an average isocyanate functionality of between 2.1 and 4.0, and (c) an amine chain extender having a specified ratio of NH2 relative to the NCO index of the polyisocyanate adduct mixture. Also disclosed is a process for preparing this composition, and a method for coating a substrate with the composition.

20 Claims, No Drawings

CROSS-LINKED AQUEOUS POLYURETHANE DISPERSIONS CONTAINING DIMER/TRIMER

This application is a continuation-in-part application of U.S. Ser. No. 08/265,369 filed Jun. 24, 1994, now allowed.

FIELD OF THE INVENTION

This invention relates generally to aqueous polyurethane dispersions, and more particularly, to aqueous polyurethane dispersions that contain polyisocyanate diner and trimer and are useful as coating compositions, particularly those that exhibit enhanced cross-linking properties relative to conventional aqueous polyurethane dispersions.

BACKGROUND OF THE INVENTION

Aqueous polyurethane dispersions are well known and are used in the production of a variety of useful polyurethane products, including, for example, coatings, films, adhesives, sealants, and the like, collectively referred to as so-called "ACS". Such dispersions are typically produced by dispersing a water-dispersible, isocyanate-terminated polyurethane prepolymer in an aqueous medium together with an active hydrogen containing chain extender, such as a diamine.

The prepolymers used in the preparation of the dispersions are generally substantially linear, that is to say difunctional, and are typically obtained by reacting an excess of a diisocyanate with an isocyanate-reactive component comprising a polymeric diol in the presence of a reactive compound, for example a diol or diisocyanate, containing an ionic or nonionic hydrophilic group or site.

Attempts to introduce higher functionality into the dispersed polyurethanes, in an effort to enhance the physical properties of the resulting ACS or shorten the curing time for these products, have not been entirely successful. One method of increasing the functionality is by incorporating a higher functionality polyol, such as a triol or tetrol, into the prepolymer, and the use of such polyfunctional active hydrogen compounds in the preparation of ionic polyurethane dispersions has been described in U.S. Pat. No. 4,554,308. The amount of polyfunctionality that can be introduced in this way is limited by the tendency of the more highly crosslinked prepolymers to gel and to form large micelles when dispersed, resulting in poor film-forming properties for this dispersion.

Another method of introducing higher functionality employs a linear prepolymer in conjunction with a trifunctional chain extender, such as diethylene triamine. This approach has been described in U.S. Pat. Nos. 4,203,883 and 4,408,008. One problem associated with these triamine cross-linked urethane dispersions is that they tend to form gels prior to use and they tend to provide poor coalescence of the films on substrates during use.

Yet another method of introducing higher functionality uses a triisocyanate in the prepolymer preparation, but this methodology causes similar problems to those that result when using a triol or tetrol in the preparation of the prepolymer, including gelation and poor dispersion of the prepolymer due to large micelle formation.

A different method of incorporating triisocyanates has been described in U.S. Pat. No. 4,507,431 which describes a process for preparing aqueous dispersions of cross-linked polyurethane ionomers. These dispersions are made by mixing an isocyanate containing prepolymer dissolved in a water-miscible organic solvent having a boiling point of from 20 to 100° C. with a polyfunctional polyisocyanate cross-linking compound having an isocyanate functionality of about 2.2 to 4. The isocyanate-containing prepolymer is prepared from a linear polyhydroxy compound having a molecular weight of from 800 to 5000, and the prepolymer has exclusively aliphatic or cycloaliphatic terminal isocyanate groups in amounts from 0.1 to 2% by weight incorporated therein by employing an aliphatic diisocyanate and/or cycloaliphatic diisocyanate compound alone as the diisocyanate reactant with said polyhydroxy compound or in conjunction with a non-aliphatic or non-cycloaliphatic diisocyanate reactant, and containing salt groups in amounts of from 0.02 to 1% by weight; so that there are from 0.1 to 1.5 isocyanate groups of said polyisocyanate per isocyanate group of said prepolymer; dispersing the resulting solution in from 40 to 80% by weight, based on the polyurethane prepolymer and the polyisocyanate, of water and evaporating the organic solvent. Unfortunately, evaporation of the solvent in the production of the aqueous dispersion in accordance with the teachings of the '431 patent is undesirable from an environmental standpoint.

Still another method of preparing aqueous polyurethane dispersions is disclosed in U.S. Pat. No. 5,169,895. The '895 patent discloses an aqueous dispersion of a water-dispersible polyurethane, wherein the polyurethane represents the reaction product of (a) a water-dispersible isocyanate-terminated polyurethane prepolymer having an NCO content of 2.1 to 10% by weight, (b) an organic polyisocyanate having an average isocyanate functionality of 2.1 to 4.0, and (c) an active hydrogen-containing chain extender, but with the proviso that the polyurethane is prepared in the absence of the steps recited to prepare the polyurethane dispersion in the above-described '431 patent. Examples of the organic polyisocyanate of component (b) of the '895 patent include the trimers of hexamethylene diisocyanate (so-called "HDI"), isophorone diisocyanate (so-called "IPDI"), and 2,4-toluene diisocyanate, biuret-modified HDI, and the adduct of 2,4-toluene diisocyanate and trimethylolpropane, as recited at column 5, lines 27–31 of the '895 patent.

New aqueous dispersions of polyurethanes providing improved physical properties for ACS applications, relative to the above-described prior art compositions such as those described in the '895 patent, would be highly desired by the ACS community. The present invention provides one such improved composition.

SUMMARY OF THE INVENTION

In one aspect, the present invention relates to a composition being an aqueous dispersion of polyurethane in water, said composition comprising water and the reaction product of:

(a) a water-dispersible isocyanate-terminated polyurethane prepolymer having an NCO content of between about 1.5 and 10% by weight, said prepolymer having incorporated therein uretdione moieties and isocyanurate moieties, and (b) an amine chain extender, in an amount sufficient to provide an $NCO/NH_2$ index of between 40 and 150 (preferably between 40 and 90, more preferably between 40 and 70). The $NCO/NH_2$ index is defined as 100 times the number of molar equivalents of NCO divided by the number of molar equivalents of $NH_2$.

In another aspect, the present invention relates to a process for preparing an aqueous dispersion of polyurethane which comprises reacting, in an aqueous medium, a reaction mixture comprising:

(a) a water-dispersible isocyanate-terminated polyurethane prepolymer having an NCO content of between about 1.5 and 10% by weight, said prepolymer having incorporated therein uretdione moieties and isocyanurate moieties, and (b) an amine chain extender, in an amount sufficient to provide an NCO/NH$_2$ index of between 40 and 150 (preferably between 40 and 90, more preferably between 40 and 70).

In yet another aspect, the present invention relates to a method for coating a substrate which comprises contacting the substrate with a coating composition comprising a dispersion in water of the reaction product of:

(a) a water-dispersible isocyanate-terminated polyurethane prepolymer having an NCO content of between about 1.5 and 10% by weight, said prepolymer having incorporated therein uretdione moieties and isocyanurate moieties, and (b)

an amine chain extender, in an amount sufficient to provide an NCO/NH$_2$ index of between 40 and 150 (preferably between 40 and 90, more preferably between 40 and 70).

Preferably, the water-dispersible isocyanate-terminated polyurethane prepolymer (i.e., component (a) described in the above-mentioned composition, process and method claims) comprises the reaction product of:

(i) an organic diisocyanate;

(ii) a polyol component comprising a polymeric diol having a molecular weight in the range from 250 to 5000, and (iii) a compound containing a hydrophilic center and at least two isocyanate or isocyanate-reactive groups.

In other aspects of the present invention, components (a) and (b) employed in the above described composition, process and method, are suitably combined, to provide a polyurethane prepolymer having at least a portion of the dimer and the trimer incorporated into the prepolymer.

These and other aspects will become apparent upon reading the following detailed description of the invention.

DETAILED DESCRIPTION OF THE INVENTION

It has now been surprisingly found by the present inventors in accordance with the present invention that the use of a polyisocyanate adduct mixture comprising an isocyanate dimer and an isocyanate trimer, together with a water-dispersible isocyanate-terminated polyurethane prepolymer, in the preparation of aqueous polyurethane dispersions, provides a polyurethane that, in use for example in ACS applications, exhibits enhanced physical properties, including increased tensile modulus, relative to the properties provided by prior art water-dispersible polyurethanes. Further, increasing the trimer content of the polyisocyanate adduct mixture, relative to the dimer content, enables the production of ACS coatings having a high initial modulus without being brittle.

Another surprising finding associated with the present invention relates to the use of an amine chain extender in the preparation of aqueous polyurethane dispersions of this invention. When using an amount of amine chain extender sufficient to provide an excess of molar equivalents of amine ("NH2") groups relative to the number of molar equivalents of free isocyanate ("NCO") groups provided by the organic polyisocyanate adduct mixture, ring opening of the dimer in the polyisocyanate adduct mixture has been found to occur, providing a final urethane product characterized by increased cross-linking relative to the final product produced in the absence of a molar excess of NH2 to NCO groups. Although in the broadest aspect of the present invention, the NCO/NH$_2$ index (e.g., 100 times the number of molar equivalents of NCO divided by the number of molar equivalents of NH$_2$) is suitably selected within a range of between about 40 and about 150, particular advantage is provided (when enhanced cross-linking of the final product is desired) by utilizing an excess of molar equivalents of amine ("NH$_2$") groups relative to the number of molar equivalents of free isocyanate ("NCO") groups provided by the organic polyisocyanate adduct mixture. Preferably, the number of molar equivalents of amine is sufficient to afford an NCO/NH$_2$ index of between 40 and 90, more preferably between 40 and 70.

The polyisocyanate used in making the isocyanate-terminated prepolymer employed in the present invention may be aliphatic, cycloaliphatic, aralphatic or aromatic polyisocyanate. Examples of suitable polyisocyanates include ethylene diisocyanate, 1,6-hexamethylene diisocyanate, isophorone diisocyanate, cyclohexane-1,4-diisocyanate, 4,4'-dicyclohexylmethane diisocyanate, m- and p-tetramethylxylene diisocyanates, p-xylene diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanates, 5-naphthalene diisocyanate. Mixtures of polyisocyanates can be used and also polyisocyanates which have been modified by the introduction of urethane, allophanate, urea, biuret, carbodiimide, uretonimine or isocyanurate residues.

The polyol employed to make the isocyanate-terminated prepolymer is suitably a high molecular weight polyol, preferably having a number average molecular weight ($M_n$) of between about 400 and about 10,000, preferably between 400 and 3,000. Examples of the high molecular weight compounds include:

1) Polyhydroxy polyesters which are obtained from polyhydric, preferably dihydric alcohols to which trihydric alcohols may be added and polybasic, preferably dibasic carboxylic acids.

Instead of these polycarboxylic acids the corresponding carboxylic acid anhydrides or poly carboxylic acid esters of lower alcohols or mixtures thereof may be used for preparing the polyesters. The polycarboxylic acids may be aliphatic, cycloaliphatic, aromatic and/or heterocyclic and they may be unsaturated and/or substituted, e.g. by halogen atoms. Examples of these acids include succinic acid, adipic acid, suberic acid, azelaic acid, sebacid acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid (which may be mixed with monomeric fatty acids), dimethyl terephthalate and bis-glycol terephthalate. Suitable polyhydric alcohols include ethylene glycol, 1,2- and 1,3 propylene glycol, 1,3- and 1,4-butanediol, 1,6-hexanediol, 1,8-octanediol, neopentyl glycol, diethylene glycol, 2-methyl-1,3-propylene glycol, 2,2-dimethyl-1,3-propylene glycol, the various isomeric bis-hydroxymethylcyclohexanes, glycerine and trimethylolpropane.

2) Polylactones generally known from polyurethane chemistry, e.g., polymers of e-caprolactone initiated with the above-mentioned polyhydric alcohols.

3) Polycarbonates containing hydroxyl groups such as the products obtained from reaction of the polyhydric alcohols previously set forth for preparing the polyhydroxy polyesters (preferably dihydric alcohols such as 1,3-propanediol, 1,4-butanediol, 1,4-dimethylol cyclohexane, 1,6-hexanediol, diethylene glycol, triethylene glycol or tetraethylene glycol) with phosgene, diaryl carbonates such as diphenyl carbonate or cyclic carbonates such as ethylene or propylene carbonate. Also suitable are polyester carbonates obtained by the reaction of lower molecular weight oligomers of the above-mentioned polyesters or polylactones with phosgene, diaryl carbonates or cyclic carbonates.

4) Polyethers include the polymers obtained by the reaction of starting compounds which contain reactive hydrogen atoms with alkylene oxides such as propylene oxide, butylene oxide, styrene oxide, tetrahydrofuran, epichlorohydrin or mixtures of these alkylene oxides. Certain proportions of ethylene oxide may also be included, provided the polyether does not contain more than 10% by weight of ethylene oxide; however, polyethers which do not contain ethylene oxide are preferably used. Suitable starting compounds containing at least one reactive hydrogen atom include the polyols set forth as suitable for preparing the polyhydroxy polyesters and, in addition, water, methanol, ethanol, 1,2,6-hexanetriol, 1,2,4-butanetriol, trimethylol ethane, pentaerythritol, mannitol, sorbitol, methyl glycoside, sucrose, phenol, isononyl phenol, resorcinol, hydroquinone and 1,1,1- or 1,1,2-tris(hydroxylphenyl)ethane. Polyethers which have been obtained by the reaction of starting compounds containing amino groups can also be used, but are less preferred for use in the present invention. Suitable amine starting compounds include ethylene diamine, diethylene triamine, triethylene tetraamine, 1,6-hexanediamine, piperazine, 2,5-dimethylpiperazine, 1-amino-3-aminomethyl-3,5,5-trimethylcyclohexane, bis(4-aminocyclohexyl) methane, bis(4-amino-3-methylcyclohexyl)methane, 1,4-cyclohexanediamine, 1,2-propanediamine, hydrazine, amino acid hydrazides, hydrazides of semicarbazido carboxylic acids, bis-hydrazides and bis-semicarbazides, ammonia, methylamine, tetramethylenediamine, ethanolamine diethanolamine, triethanolamine, aniline, phenylenediamine, 2,4- and 2,6-toluenediamine, polyphenylene polymethylene polyamines of the kind obtained by the aniline/formaldehyde condensation reaction and mixtures thereof. Resinous materials such as phenol and cresol resins may also be used as the starting materials. The preferred starting compounds for the polyethers are those compounds which exclusively contain hydroxyl groups, while compounds containing tertiary amine groups are less preferred and compounds containing isocyanate-reactive-NH groups are much less preferred.

In order to render the polyurethanes water-dispersible to enable formation of the dispersions of the present invention, it is necessary to chemically incorporate hydrophilic groups, i.e., anionic groups, potential anionic groups or nonionic hydrophilic groups, into the isocyanate-terminated prepolymer component. Suitable hydrophilic components contain at least one (preferably at least two) isocyanate or isocyanate-reactive group and at least one hydrophilic group or potential hydrophilic group. Examples of compounds which may be used to incorporate potential ionic groups include aliphatic hydroxy carboxylic acids, aliphatic or aromatic aminocarboxylic acids with primary or secondary amino groups, aliphatic hydroxy sulfonic acids and aliphatic or aromatic aminosulfonic acids with primary or secondary amino groups. These acids preferably have molecular weights below 400. It should be emphasized that the carboxylic acid groups are not considered to be isocyanate-reactive groups due to their sluggish reactivity with isocyanates.

The preferred anionic groups for incorporation into the polyurethanes in accordance with the present invention are carboxylate groups and these groups may be introduced by using hydroxy-carboxylic acids of the general formula:

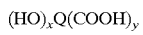

$(HO)_xQ(COOH)_y$ wherein Q represents a straight or branched, hydrocarbon radical containing 1 to 12 carbon atoms, and x and y represent values from 1 to 3. Examples of these hydroxy-carboxylic acids include citric acid and tartaric acid.

The preferred acids are those within the above-mentioned formula wherein x=2 and y=1. These dihydroxy alkanoic acids are described in U.S. Pat. No. 3,412,054, herein incorporated by reference. The preferred group of dihydroxy alkanoic acids are the α,α-dimethylol alkanoic acids represented by the structural formula

$Q'—C(CH_2OH)_2COOH$ wherein Q' is hydrogen or an alkyl group containing 1 to 8 carbon atoms. The most preferred compound is α,α-dimethylol propionic acid, i.e., wherein Q' is methyl in the above formula.

The acid groups may be converted into hydrophilic anionic groups by treatment with a neutralizing agent such as an alkali metal salt, ammonia or primary, secondary or preferably tertiary amine in an amount sufficient to render the hydroxy functional polyurethanes water dispersible. Suitable alkali metal salts include sodium hydroxide, potassium hydroxide, sodium hydride, potassium hydride, sodium carbonate, potassium carbonate, sodium bicarbonate and potassium bicarbonate. The use of alkali metal salts as neutralizing agents is less preferred than the use of volatile organic compounds such as volatile amines since they lead to reduced resistance to water swell in the coatings or other ACS product produced from the water dispersible compositions of the present invention. Therefore, less than 50%, preferably less than 20% and most preferably none of the acid groups should be neutralized with alkali metals.

In addition, the use of tertiary amines that are relatively volatile is preferred in order to facilitate easy removal of the tertiary amine component during curing of the polyurethane composition. The preferred volatile amines for neutralizing the acid groups are the tertiary amines, while ammonia and the primary and secondary amines are less preferred. Examples of suitable amines include trimethyl amine, triethylamine, trisopropylamine, tributyl amine, N,N-dimethyl-cyclohexyl amine, N,N-dimethylstearyl amine, N,N-dimethylaniline, N-methylmorpholine, N-ethylmorpholine, N-methylpiperazine, N-methylpyrrolidine, N-methylpiperidine, N,N-dimethylethanolamine, N,N-diethylethanolamine, triethanolamine, N-methyldiethanolamine, dimethylaminopropanol, 2-methoxyethyldimethylamine, N-hydroxyethylpiperazine, 2-(2-dimethylaminoethoxy) ethanol and 5-diethylamino-2-pentanone. The most preferred tertiary amines are those which do not contain isocyanate-reactive groups as determined by the Zerewitinoff test since they are particularly capable of reacting with isocyanate groups during the curing of the compositions of the present invention on the desired substrate.

The acid groups on component (iii) of the isocyanate-terminated prepolymer may be converted into hydrophilic anionic groups by treatment with the alkali metal or preferably the volatile amine either before, during or after their incorporation into the prepolymer. However, it is preferred to neutralize the acid groups after their incorporation.

The polyisocyanate adduct useful in the present invention is suitably a mixture, blend or separately added combination of polyisocyanate trimer and polyisocyanate dimer. Suitable trimers include the isocyanurate group-containing polyisocyanates prepared from the previously described aliphatic and/or cycloaliphatic diisocyanates. Particularly preferred are isocyanato-isocyanurates based on 1,6-diisocyanatohexane and/or 1-isocyanato-3,3,5-trimethyl-5-isocyanatomethylcyclohexane (isophorone diisocyanate or IPDI). The production of these isocyanurate group-containing polyisocyanates is described, for example, in DE-PS 2,616,416, EP-OS 3,765, EP-OS 10,589, EP-OS47, 452, U.S. Pat. No. 4,288,586 and U.S. Pat. No. 4,324,879. The isocyanato-isocyanurates generally have an average NCO functionality of 3 to 3.5 and an NCO content of 5 to 30%, preferably 10 to 25% and most preferably 15 to 25% by weight.

Suitable dimers include uretidione diisocyanates prepared from the previously described aliphatic and/or cycloaliphatic diisocyanates. The uretidione diisocyanates are preferably prepared from hexamethylene diisocyanate ("HDI") and/or of IPDI. Although, in theory, the uretidione diisocyanates can be used as the sole component of the polyisocyanate adduct, the present invention requires that at least some amount of trimer also be present in the polyurethane dispersions of the present invention.

In addition to the combination of a dimer and trimer, urethane and/or allophanate group-containing polyisocyanates prepared from the previously described aliphatic and/or cycloaliphatic diisocyanates, preferably hexamethylene diisocyanate or IPDI, by reacting excess quantities of the diisocyanates with the previously described low molecular weight polyols, preferably trimethylol propane, glycerine, 1,2-dihydroxy propane or mixtures thereof, are also suitably employed in fabricating the polyisocyanate adducts, if desired. If used, the urethane and/or allophanate group-containing polyisocyanates have a most preferred NCO content of 12 to 20% by weight and an (average) NCO functionality of 2.5 to 3. Likewise, oxadiazinetrione groups can be employed, if desired, in the preparation of the polyisocyanate adducts useful in the present invention, such as, for example, those prepared from HDI.

An amine chain extending agent is also employed in accordance with the present invention. Examples of Useful chain extenders or chain-lengthening agents are low-molecular-weight polyamines. Examples of useful polyamines are aliphatic polyamines such as ethylenediamine, N-hydroxyethylethylenediamine, tetramethylenediamine, hexamethylenediamine and diethylenetriamine; alicyclic polyamines such as 4,4'-diaminodicyclohexylmethane, 1,4-diaminocyclohexane and isophoronediamine; aliphatic polyamines having an aromatic ring, such as xylylenediamine and tetramethylxylylenediamine; aromatic polyamines such as 4,4'-diaminodiphenylmethane, tolylenediamine, benzidine and phenylenediamine; and inorganic diamines such as hydrazine; and mixtures of at least two of these polyamines. The amount of the chain lengthening agent is usually 0.3 to 30 wt. %, preferably 0.5 to 20 wt. %, based on the high-molecular-weight polyol in preparing the prepolymer.

In order to reduce the viscosity of the water dispersible polyisocyanates an organic solvent may be added to the water dispersible polyisocyanate.

The aqueous coating compositions according to the present invention may be applied to substrates using any of the various techniques known in the art, and the coating compositions are particularly suitable for ACS applications. In addition, the aqueous compositions may be blended with other types of resins optionally containing isocyanate-reactive groups or with amine- or phenol-formaldehyde condensates known in the art. They can also contain pigments, levelling agents, catalysts, and other auxiliaries known in the art. Examples of the application techniques, resins and auxiliaries are set forth in U.S. Pat. No. 4,408,008, which is herein incorporated by reference.

The invention is further illustrated in, but is not intended to be limited by, the following examples in which all parts and percentages are by weight unless otherwise specified.

EXAMPLE 1

Into a 3-necked round bottomed flask that was purged with nitrogen, were charged isophorone diisocyanate (65.48 g, 111.15 eq. wt., 0.5891 eq.), hexamethylene diisocyanate dimer/trimer (45.73 g, 181.12 eq. wt., 0.2529 eq.), dimethylol propionic acid (16.29 g, 67.07 eq. wt., 0.2429 eq.), polyester polyol Rucoflex S105–110 (158.25 g, 488.28 eq. wt., 0.3214 eq. wt.), methylethyl ketone (64.05 g) and dibutyltin dilaurate (0.19 g). The mixture was stirred under nitrogen and heated to 80° C. for 3.5 hours. The percentage of free NCO was measured and found to be 3.01% (theoretical 3.30%).

Into a 1000 ml beaker was charged 175 g water and triethylamine (4.21 g, 101.19 eq. wt., 0.416 eq.) and the solution was mixed. To the water mixture was added slowly 120 g of the prepolymer described above (120 g, 1396 eq. wt., 0.0860 eq.). The mixture was stirred thoroughly to form an aqueous prepolymer dispersion.

Into a separate beaker 30 g of water and ethylene diamine (2.06 g, 30.05 eq. wt., 0.0686 eq.) were added and mixed. The EDA and water mixture was added to the dispersion in the 1000 ml beaker producing a translucent, low viscosity system. The mixture was poured into jar and capped with nitrogen. The ratio of NCO equivalents (0.0860) to amine equivalents (0.0686) was 1.25 or an index of 125 in this formulation.

Test specimens for physical property determination were made by drawing thin films on tin plates and on cold rolled steel plates coated with an ECOAT and a primer. The coatings on the tin plates were removed from the plate and tensile and elongation values were obtained on an Instron see Table 1. The coatings on the cold rolled steel substrate were tested for a variety of physical properties and for chemical and solvent resistance see Table 2.

EXAMPLES 2–6

The prepolymer described in example 1 was extended with different amounts of ethylene diamine to see the effect of NCO to $NH_2$ index. The exact same procedure described above was used with the following indexes of prepolymer free NCO to amine equivalents of ethylene diamine:

|  | $NCO/NH_2$ index |
| --- | --- |
| Example 2 | 110 |
| Example 3 | 105 |
| Example 4 | 90 |

-continued

| | NCO/NH$_2$ index |
|---|---|
| Example 5 | 80 |
| Example 6 | 67 |

The tensile elongation properties are in Table 1 and the coating physical properties and chemical and solvent resistance properties are in Table 3.

EXAMPLES 7–17

The prepolymer described in example 1 was extended with two other amine chain extenders, hydrazine and isophorone diamine (IPDA), and the NCO/NH$_2$ index was varied between 120 and 50. The tensile elongation properties are reported in Table 1 and the coating physical properties and chemical and solvent resistance properties are in Table 4.

| | NCO/NH$_2$ index | Amine extender |
|---|---|---|
| Example 7 | 125 | hydrazine |
| Example 8 | 110 | hydrazine |
| Example 9 | 105 | hydrazine |
| Example 10 | 90 | hydrazine |
| Example 11 | 80 | hydrazine |
| Example 12 | 67 | hydrazine |
| Example 13 | 125 | IPDA |
| Example 14 | 110 | IPDA |
| Example 15 | 105 | IPDA |
| Example 16 | 90 | IPDA |
| Example 17 | 80 | IPDA |

Discussion of the Results for the Above Examples

The coatings prepared with ethylene diamine and isophorone diamine chain extenders showed an increase in tensile modulus and a decrease in elongation as the NCO/NH$_2$ index went down (see Table 1) indicating that the coatings exhibited increased cross-linking with increasing levels of added diamine chain extender. In contrast, the coatings prepared with hydrazine chain extender showed little variation in tensile modulus or elongation with NCO/NH$_2$ indexes between 125 and 80 however the coating with a 67 NCO/NH$_2$ index showed higher tensile modulus values and lower elongation indicating additional crosslinking was occurring. The chemical and solvent resistance properties of the coatings also improved as the index was lowered again indicating that the coatings were more crosslinked.

In order to demonstrate that the excess amine is reacting with the uretidione ring to form additional crosslinks, coatings from examples 3 and 6 were run on a FTIR using a heated ATR sample holder. The infrared spectrum from the coating of example 3, ethylene diamine extender with 105 index, showed an absorbance for the uretidione carbonyl at 1766 cm$^{-1}$. The coating from example 6, which had an excess of ethylene diamine chain extender added NCO/NH$_2$ index 67, showed no absorbance at 1766 cm$^{-1}$ in the infrared spectrum (see FIG. 2) indicating that the uretidione ring was no longer intact.

TABLE 1

Coating Tensile/Elongation Properties

| Example | Diamine Extender | NCO/NH$_2$ index | Tensile Modulus (psi) 100% | 200% | 300% | Tensile Strength (psi) | Elongation % |
|---|---|---|---|---|---|---|---|
| 1 | EDA | 125 | 950 | 1470 | 2755 | 4940 | 450 |
| 2 | EDA | 110 | 1025 | 1600 | 2900 | 5470 | 460 |
| 3 | EDA | 105 | 915 | 1480 | 2555 | 5285 | 484 |
| 4 | EDA | 90 | 1325 | 2220 | 4095 | 4810 | 330 |
| 5 | EDA | 80 | 1530 | 2680 | — | 4014 | 255 |
| 6 | EDA | 67 | 2610 | — | — | 3000 | 125 |
| 7 | NH$_2$NH$_2$ | 125 | 1400 | 3055 | 5615 | 6115 | 315 |
| 8 | NH$_2$NH$_2$ | 110 | 1490 | 3360 | 6025 | 6580 | 310 |
| 9 | NH$_2$NH$_2$ | 105 | 1410 | 3140 | 5675 | 6760 | 330 |
| 10 | NH$_2$NH$_2$ | 90 | 1490 | 3350 | 5705 | 6195 | 300 |
| 11 | NH$_2$NH$_2$ | 80 | 1470 | 3205 | 4615 | 6440 | 335 |
| 12 | NH$_2$NH$_2$ | 67 | 1885 | 3970 | — | 6180 | 260 |
| 13 | IPDA | 125 | 1825 | 3495 | 5545 | 5730 | 305 |
| 14 | IPDA | 110 | 1870 | 3840 | — | 6235 | 275 |
| 15 | IPDA | 105 | 2050 | 4070 | — | 5870 | 255 |
| 16 | IPDA | 90 | 2645 | — | — | 3830 | 150 |
| 17 | IPDA | 80 | 3105 | — | — | 3660 | 125 |

TABLE 2

Mechanical Property Data
IPDI/HDI D/T INDEX STUDY EXTENDED WITH EDA

| Test | Example 1 EDA @ 125 I | Example 2 EDA @ 110 I | Example 3 EDA @ 105 I | Example 4 EDA @ 90 I | Example 5 EDA @ 80 I | Example 6 EDA @ 67 I |
|---|---|---|---|---|---|---|
| Thickness (ml) | 1.30 ml | 1.45 ml | 1.04 ml | 1.15 ml | 1.6 ml | 1.96 ml |
| Gloss 20°/60° | 93.8/111.5 | 92.8/110.2 | 92.1/109.9 | 90.7/110.5 | 42.5/85.5 | 92.6/108.1 |
| Gloss White Panel (Before QUV) | 80.6/89.8 | 80.5/98.7 | 80.589.9 | 80.4/90.1 | 77.9/89.2 | 82.5/90.3 |
| Gloss White Panel (After QUV) | 69.2/89.5 | 81.7/91.2 | 80.4/88.3 | 85.0/92.5 | 84.3/91.9 | |
| Adhesion | Pass(5) | Pass(5) | Pass(5) | Pass(5) | Pass(5) | Pass(5) |
| Pencil Hardness | 2(#4B) | 2(#4B) | 2(#4B) | 2(#4B) | 2(#4B) | 2(#4B) |
| Direct Impact (amb) | 160+ | 160+ | 160+ | 160+ | 160+ | 160+ |
| Indirect Impact (amb) | 160+ | 160+ | 160+ | 160+ | 160+ | 160+ |
| Direct Impact −17° C. | 160+ | 160+ | 160+ | 160+ | 160+ | 95 |
| Indirect Impact −17° C. | 160+ | 160+ | 160+ | 160+ | 160+ | 10 |

TABLE 2-continued

Mechanical Property Data
IPDI/HDI D/T INDEX STUDY EXTENDED WITH EDA

| Test | Example 1 EDA @ 125 I | Example 2 EDA @ 110 I | Example 3 EDA @ 105 I | Example 4 EDA @ 90 I | Example 5 EDA @ 80 I | Example 6 EDA @ 67 I |
|---|---|---|---|---|---|---|
| Conical Bend | Pass | Pass | Pass | Pass | Pass | Pass |
| HCL 10% | No Mark | No Mark | No Mark | No Mark | No Mark | No Mark |
| NAOH 10% | Mark | Mark | Mark | Mark | Mark | Mark |
| Acetic Acid 10% | Slight Mark | Slight Mark | Slight Mark | Slight Mark | Slight Mark | Slight Mark |
| MEK | Mark | Mark | Mark | Mark | Mark | Mark |
| XYLENE | Mark | Mark | Mark | Mark | Mark | Mark |
| QUV 0 Hrs | 0.15 | 0.06 | 0.11 | 1.45 | 0.71 | |
| QUV after 2000 hrs | 4.54 | 3.5 | 2.54 | 6.81 | 2.25 | |

TABLE 3

Mechanical Property Data
IPDI/HDI D/T INDEX STUDY EXTENDED WITH HYDRAZINE

| Test | Example 7 Hydrazine @ 125 I | Example 8 Hydrazine @ 110 I | Example 9 Hydrazine @ 105 I | Example 10 Hydrazine @ 90 I | Example 11 Hydrazine @ 80% | Example 12 Hydrazine @ 67 I |
|---|---|---|---|---|---|---|
| Thickness (ml) | 1.3 ml | 1.1 ml | 1.2 ml | 1.15 ml | 1.6 ml | 2.07 ml |
| Gloss 20°/60° | 93.7/111.0 | 93.6/111.1 | 92.9/110.0 | 94.0/111.8 | 93.1/109.5 | 92.5/108.5 |
| Gloss White Panel (Before QUV) | 80.2/89.9 | 81.2/90.2 | 81.1/90.2 | 81.6/90.3 | 81.6/90.4 | 82.5/90.9 |
| Gloss White Panel (After QUV) | 74.6/89.9 | 80.8/90.6 | 76.9/89.5 | 80.2/90.2 | 79.3/90.1 | |
| Adhesion | Pass(5) | Pass(5) | Pass(5) | Pass(5) | Pass(5) | Pass(5) |
| Pencil Hardness | 2(#4B) | 2(#4B) | 2(#4B) | 2(#4B) | 2(#4B) | 2(#4B) |
| Direct Impact (amb) | 160+ | 160+ | 160+ | 160+ | 160+ | 160+ |
| Indirect Impact (amb) | 160+ | 160+ | 160+ | 160+ | 160+ | 160+ |
| Direct Impact −17° C. | 160+ | 160+ | 160+ | 160+ | 160+ | 160+ |
| Indirect Impact −17° C. | 160+ | 160+ | 160+ | 160+ | 160+ | 160+ |
| Conical Bend | Pass | Pass | Pass | Pass | Pass | Pass |
| HCL 10% | No Mark | No Mark | No Mark | No Mark | No Mark | No Mark |
| NAOH 10% | Mark | Mark | Mark | Mark | Slight Mark | Slight Mark |
| Acetic Acid 10% | Slight Mark | Slight Mark | Slight Mark | Slight Mark | Slight Mark | No Mark |
| MEK | Mark | Mark | Mark | Mark | Mark | Mark |
| XYLENE | Mark | Mark | Mark | Mark | Slight Mark | Mark |
| QUV 0 Hrs | −0.04 | −0.36 | −0.43 | −0.06 | −0.26 | |
| QUV after 2000 hrs | 2.92 | 2.57 | 2.89 | 3.14 | 3.43 | |

TABLE 4

Mechanical Property Data
IPDI/HDI D/T INDEX STUDY EXTENDED WITH IPDA

| Test | Example 13 IPDA @ 125 I | Example 14 IPDA @ 110 | Example 15 IPDA @ 105% | Example 16 IPDA @ 90 I | Example 17 IPDA @ 80 I |
|---|---|---|---|---|---|
| Thickness (ml) | 1.90 ml | 1.88 ml | 1.97 ml | 2.00 ml | 180 ml |
| Gloss 20°/60° | 11.7/42.2 | 72.3/101.5 | 37.6/78.8 | 24.7/64.9 | 34.3/76.5 |
| Gloss White Panel (Before QUV) | 9.2/36.4 | 67.2/87.1 | 25.3/62.3 | 13.2/46.1 | 20.6/57.7 |
| Gloss White Panel (After QUV) | | | | | |
| Adhesion | Pass(5) | Pass(5) | Pass(5) | Pass(5) | Pass(5) |
| Pencil Hardness | 3(#2B) | 1(#6B) | 2(#4B) | 3(#2B) | 3(#2B) |
| Direct Impact (amb) | 160+ | 160+ | 160+ | 160+ | 160+ |
| Indirect Impact (amb) | 160+ | 160+ | 160+ | 160+ | 160+ |
| Direct Impact −17° C. | 160+ | 160+ | 160+ | 130 | 60 |
| Indirect Impact −17° C. | 160+ | 160+ | 160+ | 40 | 15 |
| Conical Bend | Pass | Pass | Pass | Pass | Pass |
| HCL 10% | Slightly Mark | No Mark | No Mark | No Mark | No Mark |
| NAOH 10% | No Mark | No Mark | No Mark | No Mark | No Mark |
| Acetic Acid 10% | No Mark | No Mark | No Mark | No Mark | No Mark |
| MEK | Mark | Mark | Mark | Mark | Mark |

TABLE 4-continued

Mechanical Property Data
IPDI/HDI D/T INDEX STUDY EXTENDED WITH IPDA

| Test | Example 13 IPDA @ 125 I | Example 14 IPDA @ 110 | Example 15 IPDA @ 105% | Example 16 IPDA @ 90 I | Example 17 IPDA @ 80 I |
|---|---|---|---|---|---|
| XYLENE | Very Slight Mark | Slight Mark | Mark | Slight Mark | Slight Mark |
| QUV 0 Hrs | | | | | |
| QUV after 2000 hrs | | | | | |

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A composition being an aqueous dispersion of polyurethane in water, said composition comprising water and the reaction product of:

(a) a water-dispersible isocyanate-terminated polyurethane prepolymer having an NCO content of between about 1.5 and 10% by weight, said prepolymer having incorporated therein uretdione moieties and isocyanurate moieties, and (b) an amine chain extender, in an amount sufficient to provide an NCO/NH$_2$ index for the composition of between 40 and 150.

2. The composition of claim 1 wherein the molar ratio of said trimer to said dimer is between about 1:10 and about 10:1 and wherein said NCO/NH$_2$ index is between 40 and 90.

3. The composition of claim 1 wherein said trimer is selected from the group consisting of isocyanato-isocyanurates based on 1,6-diisocyanatohexane, 1-isocyanato-3,3,5-trimethyl-5-isocyanatomethylcyclohexane, and combinations thereof.

4. The composition of claim 1 wherein said dimer is selected from the group consisting of isocyanato uretdiones of hexamethylene diisocyanate, isophorone diisocyanate, and combinations thereof.

5. The composition of claim 1 wherein said water-dispersible isocyanate-terminated polyurethane prepolymer comprises the reaction product of:

(i) an organic diisocyanate;
   (ii) a polyol component comprising a polymeric diol having a molecular weight in the range from 250 to 5000, and (iii) a compound containing a hydrophilic center and at least two isocyanate or isocyanate-reactive groups.

6. The composition of claim 5 wherein the compound of component (iii) is dihydroxyalkanoic acid.

7. A process for preparing an aqueous dispersion of a polyurethane which comprises reacting, in an aqueous medium, a reaction mixture comprising:

(a) a water-dispersible isocyanate-terminated polyurethane prepolymer having an NCO content of between about 1.5 and 10% by weight, said prepolymer having incorporated therein uretdione moieties and isocyanurate moieties, and (b) an amine chain extender, in an amount sufficient to provide an NCO/NH$_2$ index for the composition of between 40 and 150.

8. The process of claim 7 wherein the molar ratio of said trimer to said dimer is between about 1:10 and about 10:1 and wherein said NCO/NH$_2$ index is between 40 and 90.

9. The process of claim 7 wherein said trimer is selected from the group consisting of isocyanato-isocyanurates based on 1,6-diisocyanatohexane, 1-isocyanato-3,3,5-trimethyl-5-isocyanatomethylcyclohexane, and combinations thereof.

10. The process of claim 7 wherein said dimer is selected from the group consisting of isocyanato uretdiones of hexamethylene diisocyanate, isophorone diisocyanate, and combinations thereof.

11. The process of claim 7 wherein said water-dispersible isocyanate-terminated polyurethane prepolymer comprises the reaction product of:

(i) an organic diisocyanate;
   (ii) a polyol component comprising a polymeric diol having a molecular weight in the range from 250 to 5000, and
   (iii) a compound containing a hydrophilic center and at least two isocyanate or isocyanate-reactive groups.

12. The process of claim 11 wherein the compound of component (iii) is dihydroxyalkanoic acid.

13. The process of claim 7 wherein components (a) and (b) are combined to provide a polyurethane prepolymer having at least a portion of the dimer and the trimer incorporated into the prepolymer.

14. A method for coating a substrate which comprises contacting the substrate with a coating composition comprising a dispersion in water of the reaction product of:

(a) a water-dispersible isocyanate-terminated polyurethane prepolymer having an NCO content of between about 1.5 and 10% by weight, said prepolymer having incorporated therein uretdione moieties and isocyanurate moieties, and (b) an amine chain extender, in an amount sufficient to provide an NCO/NH$_2$ index of between 40 and 150.

15. The method of claim 14 wherein the molar ratio of said trimer to said dimer is between about 1:10 and about 10:1 and wherein said NCO/NH$_2$ index is between 40 and 90.

16. The method of claim 14 wherein said trimer is selected from the group consisting of isocyanato-isocyanurates based on 1,6-diisocyanatohexane, 1-isocyanato-3,3,5-trimethyl-5-isocyanatomethylcyclohexane, and combinations thereof.

17. The method of claim 14 wherein said dimer is selected from the group consisting of isocyanato uretdiones of hexamethylene diisocyanate, isophorone diisocyanate, and combinations thereof.

18. The method of claim 14 wherein said water-dispersible isocyanate-terminated polyurethane prepolymer comprises the reaction product of:
  (i) an organic diisocyanate;
  (ii) a polyol component comprising a polymeric diol having a molecular weight in the range from 250 to 5000, and
  (iii) a compound containing a hydrophilic center and at least two isocyanate or isocyanate-reactive groups.

19. The method of claim 18 wherein the compound of component (iii) is dihydroxyalkanoic acid.

20. The method of claim 14 wherein components (a) and (b) are combined to provide a polyurethane prepolymer having at least a portion of the dimer and the trimer incorporated into the prepolymer.

* * * * *